US011408347B2

(12) United States Patent
Reuter et al.

(10) Patent No.: US 11,408,347 B2
(45) Date of Patent: Aug. 9, 2022

(54) FUEL SYSTEMS

(71) Applicants: Charles E. Reuter, Granby, CT (US);
Kevin Gibbons, Torrington, CT (US)

(72) Inventors: Charles E. Reuter, Granby, CT (US);
Kevin Gibbons, Torrington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 196 days.

(21) Appl. No.: 16/518,493

(22) Filed: Jul. 22, 2019

(65) Prior Publication Data

US 2021/0025330 A1    Jan. 28, 2021

(51) Int. Cl.
*F02C 7/228* (2006.01)
*F02C 9/26* (2006.01)
*F02C 9/34* (2006.01)
*F23R 3/34* (2006.01)

(52) U.S. Cl.
CPC .............. *F02C 7/228* (2013.01); *F02C 9/26* (2013.01); *F02C 9/263* (2013.01); *F02C 9/34* (2013.01); *F23R 3/34* (2013.01)

(58) Field of Classification Search
CPC .. F02C 7/22; F02C 7/222; F02C 7/228; F02C 7/232; F02C 9/26; F02C 9/263; F02C 9/34; F05D 2270/14; F05D 2260/96; F23R 3/34; F23R 3/346
See application file for complete search history.

(56) References Cited

U.S. PATENT DOCUMENTS

| | | | |
|---|---|---|---|
| 4,711,085 A * | 12/1987 | Lyons | F23R 3/34 60/790 |
| 9,068,509 B2 * | 6/2015 | Futa | F02C 7/232 |
| 2007/0163267 A1 | 7/2007 | Flohr et al. | |
| 2013/0199200 A1 | 8/2013 | Hoke et al. | |
| 2015/0219336 A1 | 8/2015 | Crothers et al. | |
| 2016/0305327 A1 | 10/2016 | Patel et al. | |
| 2016/0305337 A1 | 10/2016 | Crothers et al. | |
| 2018/0094590 A1 | 4/2018 | Proscia | |
| 2018/0163637 A1 * | 6/2018 | Griffiths | F23R 3/343 |

FOREIGN PATENT DOCUMENTS

| | | |
|---|---|---|
| EP | 0371250 A1 | 6/1990 |
| EP | 2568218 A2 | 3/2013 |
| EP | 2597285 A2 | 5/2013 |

OTHER PUBLICATIONS

Extended European Search Report dated Jul. 10, 2020, issued during the prosecution of European Patent Application No. EP 19216263.4.

* cited by examiner

*Primary Examiner* — Katheryn A Malatek
(74) *Attorney, Agent, or Firm* — Locke Lord LLP; Daniel J. Fiorello; Gabrielle Gelozin

(57) ABSTRACT

A fuel system can include a total flow line configured to receive a total flow and a primary flow line connected to the total flow line. The primary flow line can be in fluid communication with one or more primary fuel nozzles of a nozzle assembly. The fuel system can include a secondary flow line connected to the total flow line in parallel with the primary flow line, the secondary flow line in fluid communication with a plurality of secondary flow nozzles of the nozzle assembly. The fuel system can include a flow split system configured to control a flow split between a primary flow of the primary flow line and a secondary flow of the secondary flow line.

10 Claims, 1 Drawing Sheet

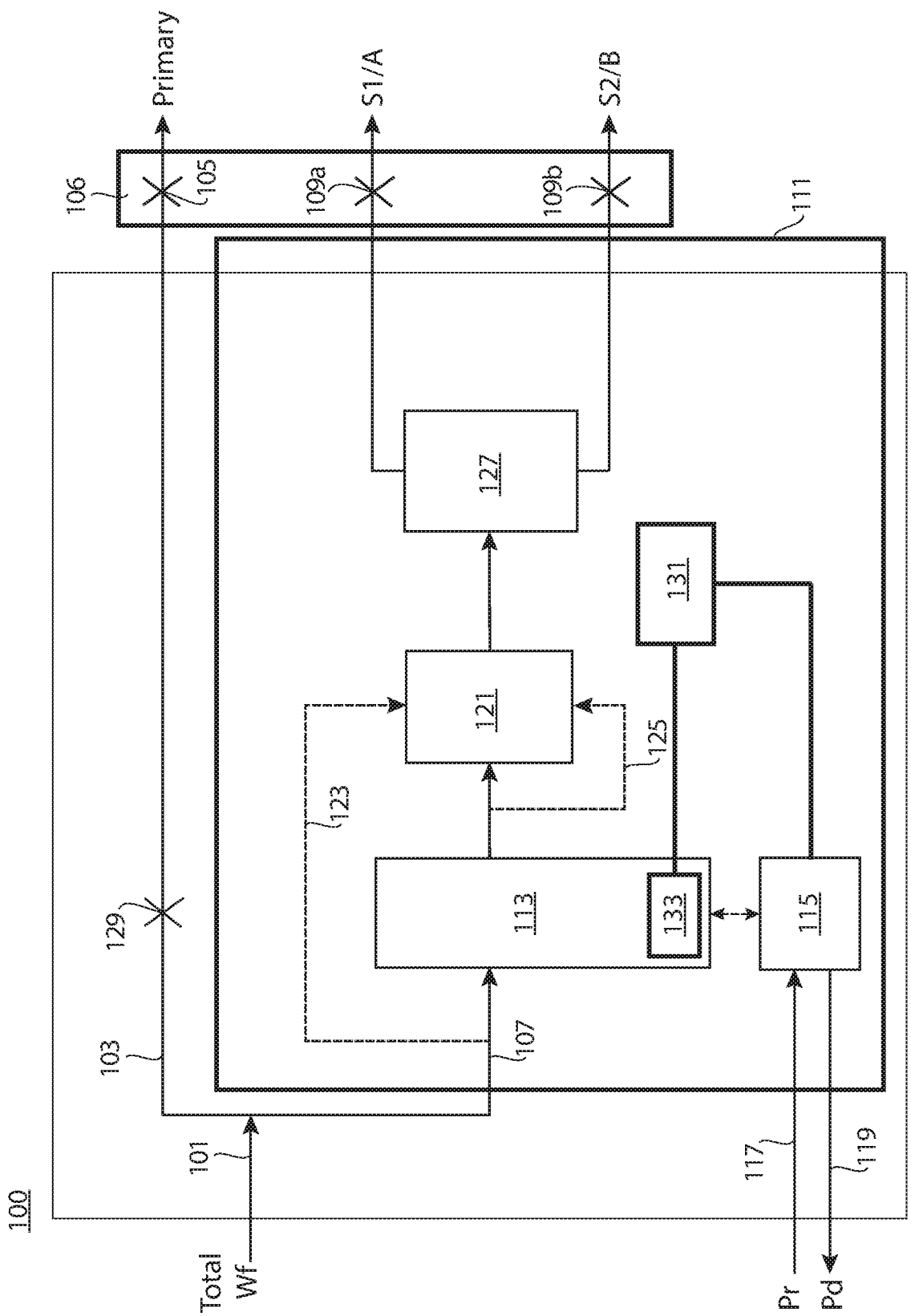

FUEL SYSTEMS

FIELD

This disclosure relates to fuel systems, e.g., for turbomachines.

BACKGROUND

Fuel systems for turbomachines can include primary nozzles and secondary nozzles in the engine combustor. Traditional systems provides for means to split flow between primary nozzles and secondary nozzles for different situations. However, there is a limit to how much modulation/scheduling can be done with current systems. Traditional systems can only provide two modes, i.e., switching between a flow split by nozzle area ratio, or enriching flow to primary nozzles by adding a restriction in secondary flow line.

Traditionally, circumferential combustor noise is addressed by not having primary nozzles on every nozzle assembly. Accordingly, traditional fuel systems cannot include primary nozzles on every nozzle assembly and still address combustor tone issues.

Such conventional methods and systems have generally been considered satisfactory for their intended purpose. However, there is still a need in the art for improved fuel systems. The present disclosure provides a solution for this need.

SUMMARY

In accordance with at least one aspect of this disclosure, a fuel system can include a total flow line configured to receive a total flow and a primary flow line connected to the total flow line. The primary flow line can be in fluid communication with one or more primary fuel nozzles of a nozzle assembly, e.g., located in an engine combustor. The fuel system can include a secondary flow line connected to the total flow line in parallel with the primary flow line, the secondary flow line in fluid communication with a plurality of secondary flow nozzles of the nozzle assembly. The fuel system can include a flow split system configured to control a flow split between a primary flow of the primary flow line and a secondary flow of the secondary flow line.

The flow split system can be configured to provide non-discrete flow splitting above a minimum flow split or at least a plurality of discreet flow splits above a minimum flow split. The flow split system can include a secondary metering valve disposed on the secondary flow line and configured to be positioned to meter flow of the secondary flow line.

The fuel system can include a torque motor configured to operate the secondary metering valve to position the secondary metering valve to control the secondary flow of the secondary flow line. The torque motor can be a pressure servo valve operatively connected to a regulated pressure line and a return pressure line to control a position of the secondary metering valve as a function of torque motor position.

The fuel system can include regulating valve disposed on the secondary flow line downstream of the secondary metering valve. The regulating valve can be configured to regulate a pressure drop across the secondary metering valve. The regulating valve can be connected to a first control line in fluid communication with the secondary flow line upstream of the secondary metering valve and to a second control line in fluid communication with the secondary flow line downstream of the secondary metering valve to control a position of the regulating valve to maintain a constant pressure drop across the metering valve, for example.

The flow split system can include a secondary nozzle splitter valve configured to divide flow between the plurality of secondary flow nozzles to provide flow maldistribution to control combustor tone. The secondary nozzle splitter valve can be configured to be positioned as a function of the secondary flow.

The fuel system can include a balancing orifice disposed on the primary flow line and configured to provide a predetermined minimum flow split. The balancing orifice can be configured to provide a pressure drop equal to the pressure drop of all valves on the secondary flow line in a full open state.

The fuel system can include a control module configured to control the torque motor to control a position of the secondary metering valve to produce a predetermined secondary flow. The control module can be configured to position the secondary metering valve based on stored correlation data that correlates position of the second metering valve to flow rate. The control module can be operatively connected to a linear variable differential transformer (LVDT) associated with the secondary metering valve to measure a position of the secondary metering valve to control the secondary flow rate as a function of the position of the secondary metering valve.

In accordance with at least of this disclosure, a method can include controlling a fuel flow split between one or more primary fuel nozzles of a nozzle assembly and a plurality of secondary flow nozzles of the nozzle assembly to control combustor tone. The method can include splitting flow between the plurality of secondary flow nozzle to provide flow maldistribution between the secondary flow nozzles to control combustor tone.

Controlling a fuel flow split can include controlling a position of a secondary metering valve disposed on a secondary flow line. Splitting flow can include controlling a position of a splitter valve as a function of secondary flow.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic diagram of a fuel system in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a fuel system in accordance with the disclosure is shown in FIG. 1 and is designated generally by reference character 100. Certain embodiments described herein can be used to control turbomachine combustor tone, e.g., to reduce combustor noise.

Referring to FIG. 1, a fuel system 100 can include a total flow line 101 configured to receive a total flow. The system 100 can include a primary flow line 103 connected to the total flow line 101. The primary flow line 103 can be in fluid communication with one or more primary fuel nozzles 105 of a nozzle assembly 106. Any suitable number of primary flow nozzles (e.g., 1, 2, etc.) is contemplated herein).

The fuel system 100 can include a secondary flow line 107 connected to the total flow line 101 in parallel with the primary flow line 103. The secondary flow line 107 can be in fluid communication with a plurality of secondary flow nozzles 109a, 109b of the nozzle assembly 106. Any suitable number of secondary flow nozzles (e.g., 2, 3, 4, etc.) are contemplated herein. For example, a nozzle assembly 106 can be split into secondary halves, e.g., as shown. In certain embodiments, a nozzle assembly 106 can include secondary quadrants.

The fuel system 100 can include a flow split system 111 configured to control a flow split between a primary flow of the primary flow line 103 and a secondary flow of the secondary flow line 107. In certain embodiments, the flow split system 111 can be configured to provide non-discrete flow splitting above a minimum flow split (e.g., where a split is determined only by the flow area of the secondary nozzles vs the flow area of the primary nozzle(s)). Any suitable flow split can be achieved with a non-discreet flow splitting scheme, for example (e.g., through use of a continuously positionable valve). In certain embodiments, the flow split system 111 can be configured to at least provide a plurality of discreet flow splits (e.g., two or more) above a minimum flow split (e.g., using a valve only capable of certain discrete positions).

In certain embodiments, the flow split system 111 can include a secondary metering valve 113 disposed on the secondary flow line 107 and configured to be positioned to meter flow of the secondary flow line 107. The secondary metering valve 113 can be any suitable valve type (e.g., a continuously positionable valve configured to be positioned in any position between open and closed). For example, the secondary metering valve 113 can be configured to be positioned in a desired place linearly.

The fuel system 101, e.g., the flow split system 111, can include a torque motor 115 and/or any other suitable actuator, configured to operate the secondary metering valve 113 to position the secondary metering valve 113 to control the secondary flow of the secondary flow line 107. As shown, the torque motor 115 can be a servo valve (e.g., a single stage servo valve) operatively connected to a regulated pressure line 117, a return pressure line 119 to control a position of the secondary metering valve 113 as a function of torque motor position. As shown, Pr can be regulated pressure and Pd can be a return pressure of the overall fuel supply system, for example. In pressure actuated embodiments, pressure can be the motive force of the secondary valve 113. However, any other suitable actuation (e.g., a fully electric motor) to drive the secondary metering valve 113 is contemplated herein.

The flow split system 111 can include regulating valve 121 disposed on the secondary flow line 107 downstream of the secondary metering valve 113. The regulating valve 121 can be configured to regulate a pressure drop across the secondary metering valve 113. The regulating valve 121 can be connected to a first control line 123 in fluid communication with the secondary flow line 107 upstream of the secondary metering valve 113 and to a second control line 125 in fluid communication with the secondary flow line 107 downstream of the secondary metering valve 113 to control a position of the regulating valve 121 to maintain a constant pressure drop across the metering valve 113, for example.

In at least some embodiments, the regulating valve 121 maintains a constant pressure drop across the secondary metering valve 113. If a pressure supplied to the secondary metering valve 113 increases, the regulating valve 121 can add pressure drop to maintain the same pressure drop over the secondary metering valve 113 (e.g., if the secondary metering valve 113 is moved to be more restricted, the regulating valve 121 can be configured to react by becoming more restricted and maintain pressure drop, and vice versa). In such embodiments, a fixed pressure drop across the secondary metering valve 113 is maintained, which maintains the relationship between secondary metering valve position and flow through the secondary metering valve 113 (e.g., secondary flow of the secondary flow line 107). Any suitable regulating valve 121 is contemplated herein (e.g., a constant area valve with a spring and a variable orifice).

The flow split system 111 can include a secondary nozzle splitter valve 127 (e.g., a flow dividing valve) configured to divide flow between the plurality of secondary flow nozzles 109a, 109b to provide flow maldistribution between the secondary flow nozzles 109a, 109b to control combustor tone. The secondary nozzle splitter valve 127 can be configured to be positioned as a function of the secondary flow (e.g., higher maldistribution at lower secondary flow to reduce combustor noise at engine low speeds). Any suitable control of the secondary nozzle splitter valve 127 is contemplated herein. The secondary nozzle splitter valve 127 can be a valve that has windows for each zone (e.g., halves S1, S2, thirds, quarters, etc.) and/or secondary nozzles 119a, 119b, and the windows can change sizes to change a flow split between the secondary nozzles 119a, 119b. The valve can be changed as a function of total secondary flow, for example. The split between secondary flow nozzles 119a, 119b can be configured to be set to reduce tone (e.g., at low power where combustor tone is frequently an issue). Accordingly, embodiments of a splitter valve 127 can control a circumferential split (e.g., in quadrants or halves, or any other zone arrangement). As appreciated by those having ordinary skill in the art in view of this disclosure, richness to a respective nozzle can change tone.

The fuel system 100 can include a balancing orifice 129 disposed on the primary flow line 103 and configured to provide a predetermined minimum flow split. The balancing orifice 129 can be configured to provide a pressure drop equal to the pressure drop of all valves (e.g., 113, 121, and 127) on the secondary flow line 107 in a full open state (e.g., to counter act the pressure drop of each device of the flow split system 111 to maintain a predetermined minimum split in the open state). For example, if the secondary metering valve 113 is fully open, the ratio of primary flow to secondary flow (the flow split) is generated only by the flow areas of primary nozzle(s) 107 and secondary nozzles 109a, 109b, however, there can still be a pressure drop from the added valves in the secondary flow line 107. The balancing orifice can thus have the same pressure drop as the valves in the full open state which can cancel the effect and cause the split to be defined only by the nozzle areas.

The fuel system can include a control module 131 configured to control the torque motor 115 to control a position of the secondary metering valve 113 to produce a predetermined secondary flow. The control module 131 can be configured to position the secondary metering valve 113 based on stored correlation data that correlates position of the second metering valve 113 to flow rate, for example. The control module 131 can be operatively connected to a linear variable differential transformer (LVDT) 133 associated with the secondary metering valve 113 to measure a position of the secondary metering valve 113 to control the secondary flow rate as a function of the position of the secondary metering valve 113. In certain embodiments, the secondary metering valve 113 can be controlled based on one or more sensor signals indicating actual flow in the secondary flow line 107 (e.g., moved until a desired flow is reached).

The control system 131 can provide current to the torque motor to command a torque motor position, which can, in turn, controls flow to or from the secondary metering valve 113 to position it. The regulated pressure can provide the muscle pressure and flow to the torque motor, which is then modulated by the torque motor to position the metering valve.

The control module 131 can include any suitable hardware and/or software to control any suitable valve and/or actuator disclosed herein, for example. The control module 131 can be integrated with an engine controller, for example. The control module 131 can be operatively connected to the splitter valve 127 to control a position thereof in addition to controlling the secondary metering valve 113. Any other suitable control scheme is contemplated herein.

In accordance with at least of this disclosure, a method can include controlling a fuel flow split between one or more primary fuel nozzles of a nozzle assembly and a plurality of secondary flow nozzles of the nozzle assembly to control combustor tone. The method can include splitting flow between the plurality of secondary flow nozzle to provide flow maldistribution between the secondary flow nozzles to control combustor tone.

Controlling a fuel flow split can include controlling a position of a secondary metering valve disposed on a secondary flow line. Splitting flow can include controlling a position of a splitter valve as a function of secondary flow. The method can include controlling a secondary metering valve, e.g., as described above, to counteract the effect of splitting the flow to maintain a predetermine split between the primary flow and the secondary flow.

The method can include any other suitable method(s) and/or portion(s) thereof. Any suitable method(s) and/or portion(s) thereof can be stored as computer readable instructions (e.g., on a non-transitory computer readable medium) and performed by one or more suitable modules (e.g., the control module 131) as appreciate by one having ordinary skill in the art in view of this disclosure.

Embodiments can include an electronic engine controller (EEC) controlled secondary metering valve and a throttling regulating valve to schedule a primary/secondary flow split by modulating secondary flow, for example. In certain embodiments, any and all split ratios (primary/secondary) greater than a minimum primary split can be achieved by scheduling secondary flow with the secondary metering valve and regulator. The regulating valve can restrict a secondary flow path as necessary to regulate secondary metering valve pressure drop. In certain embodiments, remaining flow spills to the primary flow path.

Commanding secondary flow greater than split ratio can drive the regulating valve full open resulting in minimum pressure drop in secondary flow line. The balancing orifice in the primary flow line can be sized to equal metering valve and regulating valve pressure drop to assure the desired nozzle split ratio is achieved. The torque motor can include a null bias to open the secondary metering valve to assure minimum split ratio in the failsafe position.

In embodiments, secondary nozzle split can be accomplished as a function of metered flow with a multi-zone flow divider valve. The upstream secondary metering valve and regulating valve can assure that primary/secondary split is unaffected by the splitter valve position. In certain embodiments, splitter valve feedback can be supplied to the control module for fault detection and/or control of the splitter valve, for example.

Embodiments can control fuel flow distribution into an engine burner for reduction of combustor tone. Embodiments can provide optimal control and flexibility by providing two independent controls to provide a variable primary/secondary split and a variable circumferential fuel redistribution of secondary fuel flow in a predetermined pattern (e.g., in a four-quadrant pattern).

Total flow can be metered upstream at a fuel metering unit on the total flow line. Embodiments can split that flow between primary and secondary nozzles. Embodiments can meter flow to the secondary nozzles with a secondary metering valve and an inline pressure regulating valve, for example. The inline regulating valve can add or reduce pressure drop through the secondary flow line to achieve the desired flow split between primary and secondary lines. Total flow that is not metered through the secondary metering valve can be delivered to the primary nozzles, for example. Downstream of the secondary metering valve can be a flow divider valve that then splits secondary flow to opposing burner quadrants or any other suitable number of zones (e.g., as disclosed above) as a function of secondary flow. This results in flow maldistribution between the quadrants or other number of zones which can reduce combustor tone, for example.

Accordingly, embodiments can provide infinitely variable flow split metering between primary and secondary flow lines and/or nozzles to provide maximum metering flexibility and allow split change during development. Embodiments can further provide flow split to opposing quadrants or other numbers of zones in the secondary manifold to reduce combustor noise.

As will be appreciated by those skilled in the art, aspects of the present disclosure may be embodied as a system, method, or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fuel system, comprising:
a total flow line configured to receive a total flow;

a primary flow line connected to the total flow line, the primary flow line in fluid communication with one or more primary fuel nozzles of a nozzle assembly;

a secondary flow line connected to the total flow line in parallel with the primary flow line, the secondary flow line in fluid communication with a plurality of secondary flow nozzles of the nozzle assembly;

a flow split system configured to control a flow split between a primary flow of the primary flow line and a secondary flow of the secondary flow line, wherein the flow split system is configured to provide non-discrete flow splitting above a minimum flow split or at least a plurality of discreet flow splits above a minimum flow split, wherein the flow split system includes a secondary metering valve disposed on the secondary flow line and configured to be positioned to meter flow of the secondary flow line, wherein the flow split system includes a secondary nozzle splitter valve configured to divide flow between the plurality of secondary flow nozzles to provide flow maldistribution to control combustor tone, wherein the secondary nozzle splitter valve is configured to be positioned as a function of the secondary flow;

a control module configured to schedule a primary/secondary flow split by modulating the secondary flow; and a balancing orifice disposed on the primary flow line and configured to provide a predetermined minimum flow split, wherein the balancing orifice is configured to provide a pressure drop equal to the pressure drop of all valves on the secondary flow line in a full open state.

2. The fuel system of claim 1, the flow split system further comprising a torque motor configured to operate the secondary metering valve to position the secondary metering valve to control the secondary flow of the secondary flow line.

3. The fuel system of claim 2, wherein the torque motor is a pressure servo valve operatively connected to a regulated pressure line and a return pressure line to control a position of the secondary metering valve as a function of a position of the torque motor.

4. The fuel system of claim 2, wherein the control module is configured to control the torque motor to control a position of the secondary metering valve to produce a predetermined secondary flow.

5. The fuel system of claim 4, wherein the control module is configured to position the secondary metering valve based on stored correlation data that correlates position of the second metering valve to the flow rate of the secondary flow.

6. The fuel system of claim 5, wherein the control module is operatively connected to a linear variable differential transformer (LVDT) associated with the secondary metering valve to measure a position of the secondary metering valve to control the secondary flow rate as a function of the position of the secondary metering valve.

7. The fuel system of claim 1, the flow split system further comprising a regulating valve disposed on the secondary flow line downstream of the secondary metering valve, wherein the regulating valve is configured to regulate a pressure drop across the secondary metering valve.

8. The fuel system of claim 7, wherein the regulating valve is connected to a first control line in fluid communication with the secondary flow line upstream of the secondary metering valve and to a second control line in fluid communication with the secondary flow line downstream of the secondary metering valve to control a position of the regulating valve to maintain a constant pressure drop across the metering valve.

9. A method for controlling a fuel flow split in a fuel system, the fuel system comprising:
a total flow line configured to receive a total flow;
a primary flow line connected to the total flow line, the primary flow line in fluid communication with one or more primary fuel nozzles of a nozzle assembly;
a secondary flow line connected to the total flow line in parallel with the primary flow line, the secondary flow line in fluid communication with a plurality of secondary flow nozzles of the nozzle assembly;
a fuel flow split system configured to control the fuel flow split between a primary flow of the primary flow line and a secondary flow of the secondary flow line, wherein the fuel flow split system includes a secondary metering valve disposed on the secondary flow line and a secondary nozzle splitter valve;
a control module; and
a balancing orifice disposed on the primary flow line and configured to provide a predetermined minimum fuel flow split, wherein the balancing orifice is configured to provide a pressure drop equal to the pressure drop of all valves on the secondary flow line in a full open state; and the method comprising:
controlling the fuel flow split between the one or more primary fuel nozzles of the nozzle assembly and the plurality of secondary flow nozzles of the nozzle assembly to control combustor tone, further comprising splitting flow between the plurality of secondary flow nozzle to provide flow maldistribution between the secondary flow nozzles to control combustor tone, wherein controlling the fuel flow split includes controlling a position of the secondary metering valve disposed on the secondary flow line, and controlling a position of the splitter valve as a function of secondary flow.

10. A fuel system, comprising:
a total flow line configured to receive a total flow;
a primary flow line connected to the total flow line, the primary flow line in fluid communication with one or more primary fuel nozzles of a nozzle assembly;
a secondary flow line connected to the total flow line in parallel with the primary flow line, the secondary flow line in fluid communication with a plurality of secondary flow nozzles of the nozzle assembly; and
a flow split system configured to control a flow split between a primary flow of the primary flow line and a secondary flow of the secondary flow line, wherein the flow split system includes a secondary metering valve disposed on the secondary flow line and configured to be positioned to meter flow of the secondary flow line and a secondary nozzle splitter valve configured to divide flow between the plurality of secondary flow nozzles to provide flow maldistribution to control combustor tone, wherein the secondary nozzle splitter valve is configured to be positioned as a function of the secondary flow, further comprising a balancing orifice disposed on the primary flow line and configured to provide a predetermined minimum flow split, wherein the balancing orifice is configured to provide a pressure drop equal to the pressure drop of all valves on the secondary flow line in a full open state.

* * * * *